United States Patent
Luo et al.

(10) Patent No.: US 7,778,273 B2
(45) Date of Patent: Aug. 17, 2010

(54) APPLICATION-LEVEL MULTICASTING ARCHITECTURE

(75) Inventors: Chong Luo, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 11/255,797

(22) Filed: Oct. 21, 2005

(65) Prior Publication Data

US 2007/0091918 A1  Apr. 26, 2007

(51) Int. Cl.
*H04J 3/16* (2006.01)

(52) U.S. Cl. ............... 370/465; 370/260; 370/390; 370/312; 379/202.01; 379/93.21; 379/158

(58) Field of Classification Search .......... 370/260, 370/390, 312, 465; 379/202.01, 93.21, 158
See application file for complete search history.

(56) References Cited

U.S. PATENT DOCUMENTS

| | | | |
|---|---|---|---|
| 6,321,270 B1 * | 11/2001 | Crawley | 709/238 |
| 6,687,358 B1 | 2/2004 | Mark | |
| 6,813,714 B1 * | 11/2004 | Hardjono et al. | 726/14 |
| 6,950,432 B2 * | 9/2005 | Chen et al. | 370/390 |
| 7,007,100 B1 * | 2/2006 | Doong et al. | 709/238 |
| 7,099,323 B1 * | 8/2006 | Doong et al. | 370/390 |
| 7,099,370 B2 * | 8/2006 | Takahashi | 375/132 |
| 7,400,596 B1 * | 7/2008 | Robertson et al. | 370/312 |
| 2003/0120917 A1 | 6/2003 | Itonaga | |
| 2003/0165160 A1 * | 9/2003 | Minami et al. | 370/466 |
| 2004/0205215 A1 * | 10/2004 | Kouvelas et al. | 709/231 |
| 2006/0221975 A1 * | 10/2006 | Lo et al. | 370/395.5 |
| 2007/0002859 A1 * | 1/2007 | Corson et al. | 370/390 |

OTHER PUBLICATIONS

Pendarakis (ALMI: An Application Level Multicast Infrastructure, 2001).*
Strowes (Peer-to-Peer Audio Conferencing, Department of Computing Science University of Glasgow, 2004).*
Luo, Chong; Zhu, Zeng; Li, Jiang, "A Multiparty Videoconferencing System over an Application-Level Multicast Protocol", Abstact.
Y. Chu; S. Rao; S. Seshan; H. Zhang, "Enabling Conferencing Applications on The Internet Using an Overlay Multicast Architecture", ACM SIGCOMM 2001 conference, vol. 31, pp. 55-67, Aug. 2001.
Y. Chu; S. Rao; H. Zhang, "A Case for End System Multicast", ACM Sigmetrics 2000 Conference, vol. 28, pp. 1-12, Jun. 2000.

(Continued)

*Primary Examiner*—Huy D Vu
*Assistant Examiner*—Kibrom T Hailu

(57) ABSTRACT

An application-level multicasting architecture that enables multiple nodes to interact in real time with data packets that are routed based on information about the connection states between the nodes is provided. Each node shares their connection states with other nodes in the same interactive session. The data packets may be routed in the application level using multiple packet transport protocols that are available on the sending node. A particular transport protocol may be selected based on a Quality of Service (QoS) requirement of the data packet. Nodes in the interactive session may relay data packet to other nodes according to a routing map that is created based on the connection states. The application-level multicasting architecture may be implemented for any multiparty interactive application, such as an application for videoconferencing, multiplayer games, distance learning, virtual meeting, and voice communication.

18 Claims, 13 Drawing Sheets

OTHER PUBLICATIONS

M. Hosseini; N. Georganas, Design of a Multi-Sender 3d Videoconferencing Application Over an End System Multicast Protocol, ACM international conference on Multimedia, pp. 480-489, Nov. 2003.

D. Pendarakis; S. Shi; D. Verma; M. Waldvogel, "Almi: An Application Level Multicast Infrastructure", 3rd Usenix Symposium on Internet Technologies and Systems (USITS), Mar. 2001.

Scribe: A large-scale and decentralized application-level multicast infrastructure; IEEE Journal on Selected Areas in Communications, vol. 20, No. 8, Oct. 2002; Castro et al.

International preliminary report on patentabality, in PCT/US2006/041057, mailed May 2, 2008.

International Search Report; Korean Intellectual Property Office; Authorized Officer: Lee, Hee Bong; Feb. 26, 2007; 1 page.

* cited by examiner

| Magic Word | Version | Reliability | Ack Sequence |
|---|---|---|---|
| Message ID | Message length | | |
| Sender ID | | | |

600

| Source ID | | | |
|---|---|---|---|
| Message type | Media type | No. of receivers | Topology length |
| [Receiver list ...] | | | |
| [Sequence number] | | | |
| [Stream bit rate] | | | |
| [Topology ...] | | | |

FIG. 6

| Round number | Sequence number |
|---|---|
| Timestamp ||
| Data ||

900 ↘

| Round number | Increasing trend |
|---|---|
| Available bandwidth ||

FIG. 9

APPLICATION-LEVEL MULTICASTING ARCHITECTURE

BACKGROUND

With the development of the Internet technology and the broadband networks, there are increasing numbers of multiparty interactive applications available on the market. Multiparty interactive applications typically enable multiple users to interact in real time. Examples of these applications include videoconferencing, Internet games, distance learning, and the like. The media transmission in these applications is characterized by one-to-many semantics.

Multiparty interactive applications employ communication mechanism in the network layer to manage the transmission of packets between the applications. Typically, only one type of transport protocol is used. For example, a multiparty interactive application may send packets to other applications using Transmission Control Protocol (TCP) mechanisms. TCP is a reliable protocol for controlled message delivery and requires separate connections for each source-destination pair. Thus, exclusively using TCP mechanisms can become cumbersome for an interactive session that involves multiple participants.

The use of user datagram protocol (UDP) may be a quicker way for multiparty interactive applications to send packets to other applications. However, UDP is connectionless and provides very few error recovery services. Thus, UDP is not a desirable transmission mechanism where reliability is a significant requirement.

Multiparty interactive applications may also employ IP multicast to handle data transmission. IP multicast is a method whereby a message can be sent simultaneously to a set of destinations. Unfortunately, IP multicast typically requires specialized routers which understand the protocol and are able to replicate the packets at the appropriate time. So, although IP multicast can be effective in a private network, IP multicast is not practical for nodes in disparate networks to interact in real time over the Internet.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an application-level multicasting architecture that enables multiple nodes to interact in real time with data packets that are routed based on information about the connection states between the nodes. In one implementation, each node shares their connection states with other nodes in the same interactive session. The data packets may be routed in the application level using multiple packet transport protocols that are available on the sending node. A particular transport protocol may be selected based on a Quality of Service (QoS) requirement of the data packet. Nodes in the interactive session may relay data packet to other nodes according to a routing map that is created based on the connection states. The multicasting architecture may be implemented for any multiparty interactive application, such as an application for videoconferencing, multiplayer games, distance learning, virtual meeting, and voice communication.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 shows an example header for a routing-level protocol data packet for an application-level multicasting system.

FIG. 9 shows an example data packet with bandwidth measurement report for an application-level multicasting system.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
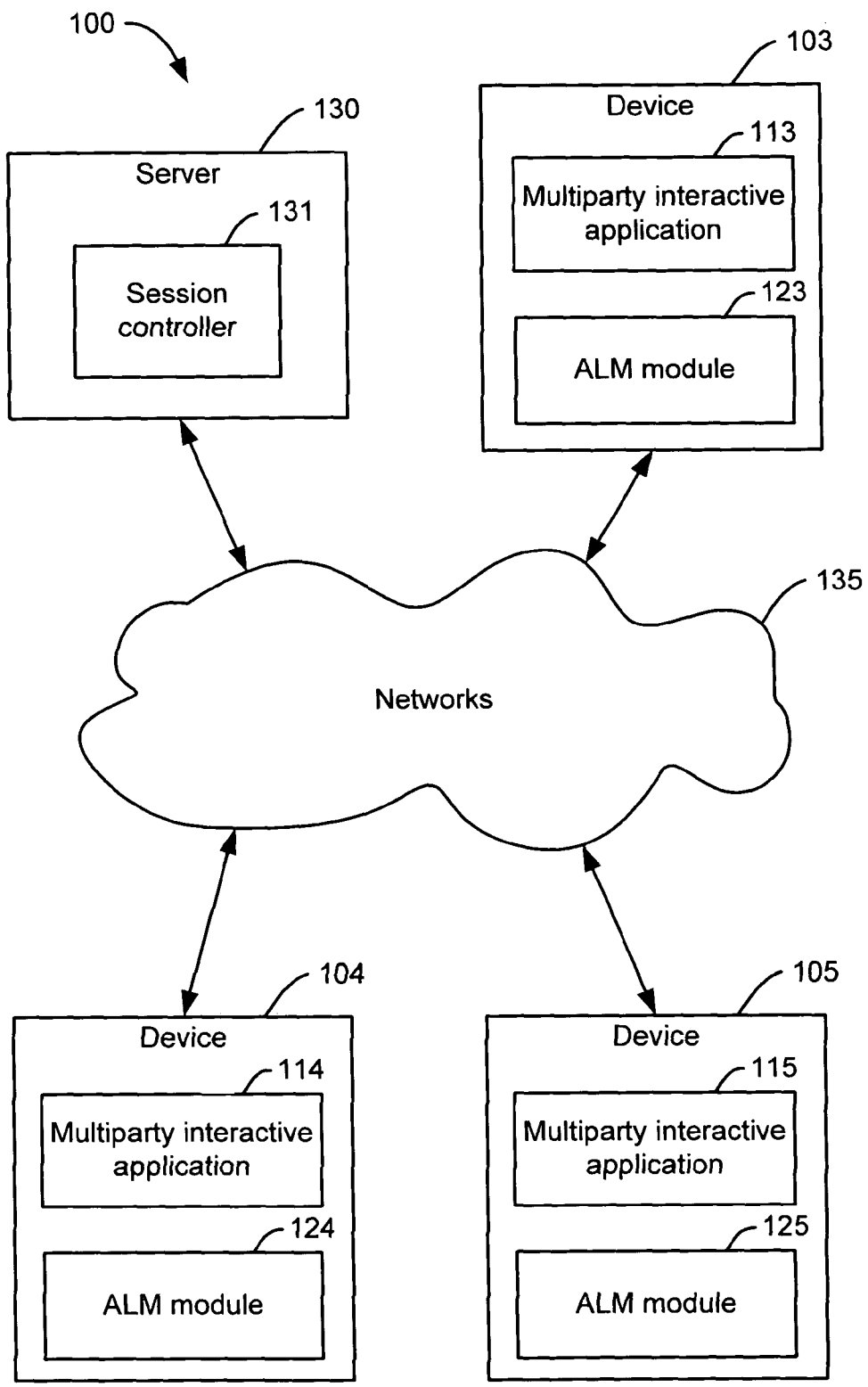
FIG. 1 shows an example application-level multicasting (ALM) system 100.

FIG. 1 shows an example application-level multicasting (ALM) system 100. Multicasting is the process of communicating a common message to a select group of recipients. In distinction from IP multicasting which requires the network routers to determine the packet delivery paths and to replicate the packets when needed, application-level multicasting pushes all the functionalities to the end systems. ALM does not require any special support from the network routers; therefore it can be easily adopted on top of the existing network infrastructure. As shown in FIG. 1, system 100 includes multiparty interactive applications 113-115 in devices 103-105. Multiparty interactive applications are configured to enable members of an interactive session to interact with each other through multicasting in networks 135. In this example, multiparty interactive applications 113-115 may be any type of applications that are capable of interacting in real time, such as applications for videoconferencing, multiplayer games, distance learning, virtual meeting, voice communication, or the like. An interactive session includes any session that enables multiparty interactive applications 113-115 to exchange data. For example, an interactive session can be a video conference, an audio conference, a multimedia conference, online gaming, or any event that involves multiple users. Session controller 131 in server 130 is configured to establish communication sessions between multiparty interactive applications 113-115.

For the actual process of communication, multiparty interactive applications 113-115 are configured to interact with ALM modules 123-125 in devices 103-105. ALM modules 123-125 are configured to handle communication between multiparty interactive applications 113-115 with application-level network monitoring and data packet routing. In particular, ALM modules 123-125 are configured to determine the available transport mechanisms and to send data packets with the most appropriate mechanism that is available. ALM modules 123-125 are also configured to monitor the states of the connections between devices 103-105 and to route the data packets in accordance with the most updated states. An example ALM module will be discussed below in conjunction with FIG. 2.

In an example operation, multiparty interactive application 113 receives a request from a user to initiate an interactive session with other users in devices 104-105. Multiparty interactive application 113 establishes the session with session controller 131, which provides information about the session to multiparty interactive applications 114-115 for other members to join the initiating user in the session. Multiparty interactive applications 113-115 then interact with ALM modules 123-125 to establish connections (i.e. links) with each other. ALM modules 123-125 then determine connection states relative with each other, such as latency, connectivity, available transport protocols, and the like, and send the information to each other. Based on the information, each ALM module computes a route for sending data packets to each of the other devices in the interactive session.

Figure 2:
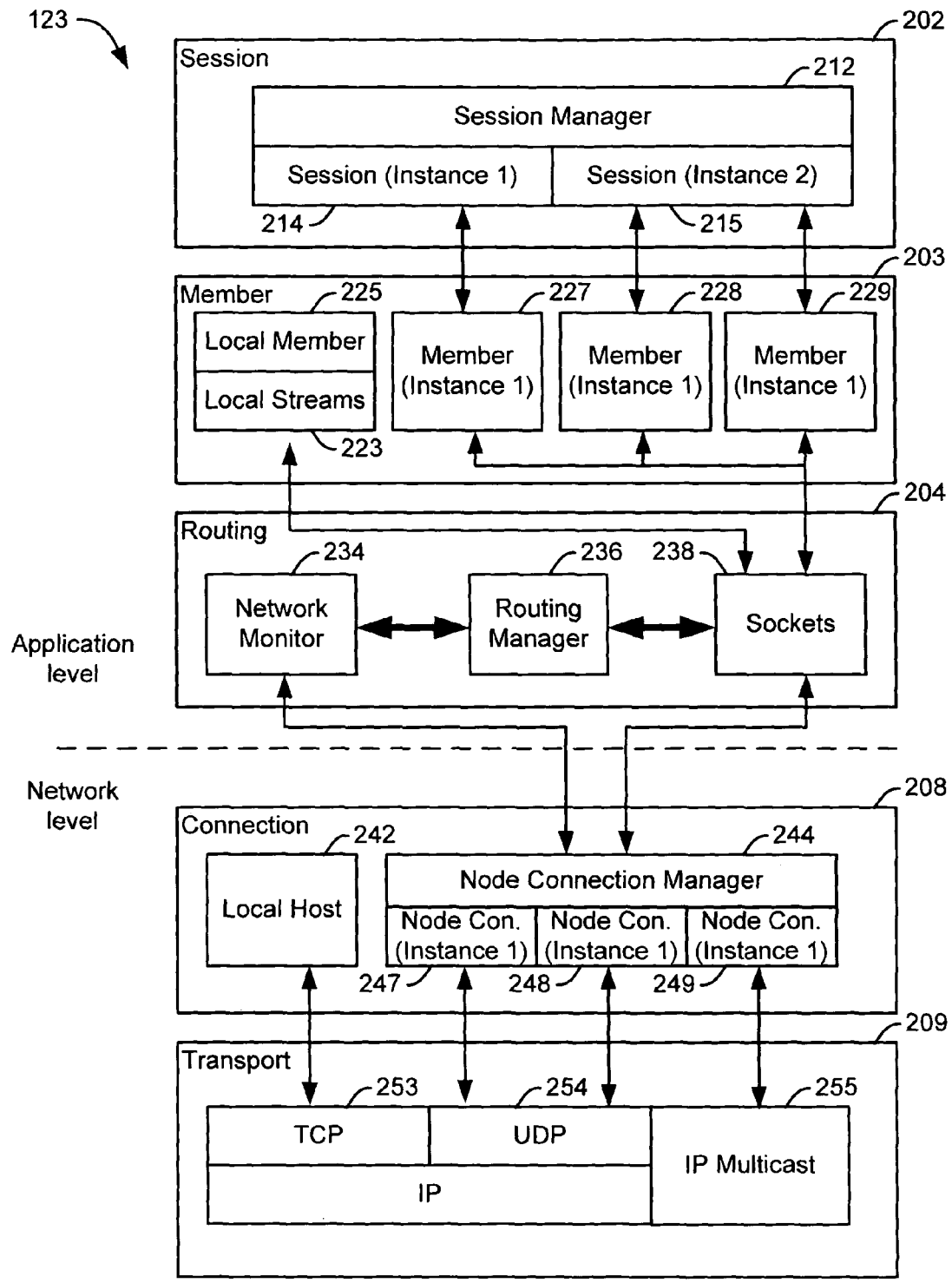
FIG. 2 shows an example architecture for the ALM module shown in FIG. 1.

FIG. 2 shows an example architecture for the ALM module 123 shown in FIG. 1. ALM module 123 enables a node (e.g. a device running a multiparty interactive application) to communicate with other nodes in an interactive session with multiple members. In particular, the multiparty interactive application can rely on ALM module 123 to actively manage data packet routing, without solely relying on the direct one-one connections. ALM module 123 is capable of selecting from multiple types of protocols to handle data packet routing. These protocols typically include Transmission Control Protocol (TCP), User Datagram Protocol (UDP) and protocols related to IP Multicast. UDP is a light-weight protocol suitable for media stream transmission. TCP is a reliable protocol suitable for control message delivery. End systems in the same interactive session may be configured to build both TCP and UDP channels with each other. The connection attempts may be sent to various types of network addresses, such as private address that the client sees locally, public address discovered by the server, the public address that the client retrieves from a Universal Plug and Play (UPnP) enabled Network Address Translation (NAT), IP multicast address, and the like.

In order to enable UDP communications between end systems behind different NATs, a UDP punching protocol is defined and is similar to Simple Traversal of UDP through NAT (STUN). In one example implementation, each node sends a certain number of UDP packets (e.g. 10 packets) to each available network address of the other nodes in the interactive session. If the sending node cannot get the response after sending all these packets to a particular node, the sending node will assume that the particular node is not reachable via UDP.

Besides TCP and UDP, ALM module 123 utilizes IP multicast when available. IP multicast is an efficient mechanism for one-to-many data distribution. However, IP multicast is typically not globally deployed because of inherent problems. Generally, IP multicast has spotty deployment, mostly in private networks. Utilizing IP multicast when it is available can greatly increase the efficiency of data delivery. In an example implementation, each interactive session is associated with an IP multicast address, which may be randomly generated by the node or the server that initiated the session. This address may be registered on the session controller on a server and distributed to the other nodes when joining. Each node that joins this interactive session sends out its own information. If a node receives the probing packet from a member in the same session through the IP multicast channel, the node may stop TCP/UDP probing and use IP multicast for all the subsequent communications.

As shown in FIG. 2, ALM module 123 includes components in the application level. The components may be implemented in the session layer 202, member layer 203, and routing layer 204. ALM module 123 may also include components in the network level. These components may include in connection layer 208 and transport layer 209.

ALM module 123 is configured to enable a user to initiate and to participate multiple interactive sessions concurrently. For example, ALM module 123 may be configured to support a multiparty A/V conferencing application that enables a user to establish multiple conferencing session with different sets of member nodes. ALM module 123 may also allow the user to attend multiple conferencing sessions at the same time. In session layer 202, session objects, such as session objects 214 and 215, are configured to maintain the interactive sessions and a list of members or attendees for each session. Session objects 214-215 are managed by session manager 212.

Because ALM module 123 includes components in different layers, the components in the connection layer 208 may be unaware of which interactive session a member node is participating. Thus, even when a node is present in two or more sessions, ALM module 123 may only create one node connection module instance and maintain only one connection per type.

In member layer 203, each of the member modules 227-229 is configured to keep the application-level properties of a member, such as the member ID, the interactive session in which it is participating, and the like. Typically, there is a one-one mapping between member modules 227-229 in the application level and node connection modules 247-249 in the network level. Each of the member modules 227-229 is also configured to manage the media data from the corresponding member, and to assemble A/V packets if channel coding is used.

Local member module 225 is configured to manage local streams 223 that are generated by a multiparty interactive application in the same node. For example, local member module 225 may receive data streams from media capturing modules in the node and send the streams to other nodes in an interactive session using information provided by member modules 227-229.

Components in routing layer 204 serve as a multicast-enabled router on the application level. Typically, outgoing and incoming packets to ALM module 123 pass through routing layer 204. Components in routing level 204 forward the application-defined packets to the other members in the interactive session. A destination ID in a packet may be used to choose a next-hop to forward the packet. As shown in FIG. 2, components in routing layer 204 may include network monitor 234, routing manager 236, and sockets 238.

Routing manager 236 is configured to handle data packet routing for ALM module 123. A data packet handled by ALM 123 may have multiple destinations. For example, the local node may not be the sole destination, or even the destination of the packets it received. Thus, for any incoming packets, routing manager 236 is configured to check whether the local node is one of the destinations. If so, routing manager 236 forwards the packet to the upper layers. Routing manger 236 is also configured to check whether this packet needs to be relayed to other nodes. The routing information can be found in a local routing table maintained by routing manager 236 or can be carried by the packet.

ALM module 123 is configured with an application-level connections state routing. Each node periodically measures the network dynamics of its neighbors and propagates the information to all other nodes in the same interactive session. Network monitor 234 is configured to probe and propagate the network information. Network monitor 234 is also configured to maintain a map of the nodes in the same interactive session. Whenever a connection status message arrives, network monitor 234 uses the information to update the map.

When the connection status changes, routing manger 236 is configured to re-compute routes for each active stream by any method, such as applying Dijkstra's SPF algorithm, extended broadest path first (BPF) algorithm and the like. Routing manager 236 may also re-compute routes for an active stream if the subscription status of a node associated the active stream changes. The routing information is saved in a routing table. Different from the per-packet IP routing, ALM 123 is configured with source-specific per-stream routing. The data delivery routes are calculated at the source and forwarded to all the relay nodes. Thus, routing manager 236 maintains the routing table for not only the local stream but also the streams it needs to relay.

In connection layer 208 of the network level, each of the node connections 247-249 is configured to maintain available connections, such as TCP, UDP, and IP multicast, to a specific node. Node connections 247-249 provide an abstract network channel for the communication with each node associated with an interactive session. The type of available connections is typically transparent to routing layer 204 and above. Outgoing packets generated by local streams 223 or network monitor 234 will typically go through a routing table to get the next hop information. Then, the packets are passed to the corresponding node connection modules 247-249. Node connection modules 247-249 will automatically select the most appropriate connection to send the packet according to the specified Quality of Service (QoS) requirement.

Node connection modules 247-249 are managed by node connection manager 244, which is configured to add, delete, and update the module instances. In one implementation, the incoming packets typically do not go to the node connection modules 247-249 directly. Instead, incoming packets may be passed to node connection manager 244, which is configured to maintain a receive buffer for each TCP socket, since TCP packets can be combined or partitioned by the underlying network. Node connection manager 244 may be configured to keep the incoming bitstream and does not pass them to node connection modules 247-249 until a complete packet is received. For the UDP packets, node connection manager 244 may be configured to unpack the packets and retrieve the source ID before passing the packet to the right node connection modules.

In transport layer 209, ALM module 123 is configured to utilize transport mechanisms that are available in the node. In this example, the transport mechanisms in the node include TCP 253, UDP 254, IP multicast 255.

ALM module 123 may expose application program interfaces (APIs), which enable applications, such as multiparty interaction application 113 in FIG. 1, to interact with ALM module 123. Below are example APIs that may be exposed by sockets 238 of ALM module 123:

InitSocket( ) Init the application level socket.

CloseSocket( ) Close the application level socket.

AddMember(MemberID id, ADDRESS address) Call this interface to inform the routing layer and the connection layer of a new member node in the interactive session. Without calling this interface, the routing layer may not send any data to this member and may not accept any data from this member.

UpdateMember(MemberID id, ADDRESS address) Call this interface to update the address information of a member node.

CloseMember(MemberID id) Call this interface to inform the routing layer and the connection layer of the leave of a member node. After this method is processed, the local site may not send any data to the member any longer.

CreateStream(StreamType type, StreamInfo info) Call this interface to register a new stream, such as audio and video. The StreamInfo contains the bit rate of the stream.

UpdateStream(StreamID id, StreamInfo info) Call this interface to update the StreamInfo of a specific stream.

DeleteStream(StreamID id) Call this interface to unregister an existing stream. The corresponding routing information may be deleted from the routing table.

AddSource Membership(MemberID id, StreamType type) Call this interface if the user want to subscribe to a specific stream of a specific member node.

DropSourceMembership(MemberID id, StreamType type) Call this interface if the user want to unsubscribe to a specific stream of a specific member node.

AddReceiver(StreamType type, MemberID id) Call this interface if the local site receives a subscription message from member id.

RemoveReceiver(StreamType type, MemberID id) Call this interface if the local site receives a unsubscription message from member id.

UpdateReceivers(StreamType type, MemberID Set idSet) Call this interface to update the receiver set of a specific stream.

Send(StreamID id, LPVOID data, UINT length) Call this interface to send data of a specific stream. The application layer may not need to specify the receiver set, since ALM 123 may be implemented as a per-stream routing protocol. The receiver set of each stream is maintained by the routing layer.

BroadcastMessage(Message msg) Broadcast a control message to all the members in the ALM group, no matter whether they have subscribed to any of the local streams or not.

SetOnReceiveCallback( ) Call this interface to set the callback function in order to receive the application level data, such as the audio and video from other conference member.

Below is an example API that may be exposed by routing manager 236:

GetRoutingTopo(MemberID id, StreamType t, CTopology &tp) This interface allows the developer/user to visualize the application level transmission routes. The topology is saved in a block of memory and may be implemented with the same format as defined in the routing-level protocol.

Below are example APIs that may be exposed by network monitor 234:

SetBWMeasurementData(LPVOID data[ ], UINT unitLen, UINT packets) This interface allows the developer to set the data used for bandwidth measurement. The data are segmented and coded (if the developer wants to do channel coding) at the application level.

SetBWDataProcessCallback( ) If the developer wishes to utilize the bandwidth measurement data, he may call this interface to set the callback function.

Figure 3:
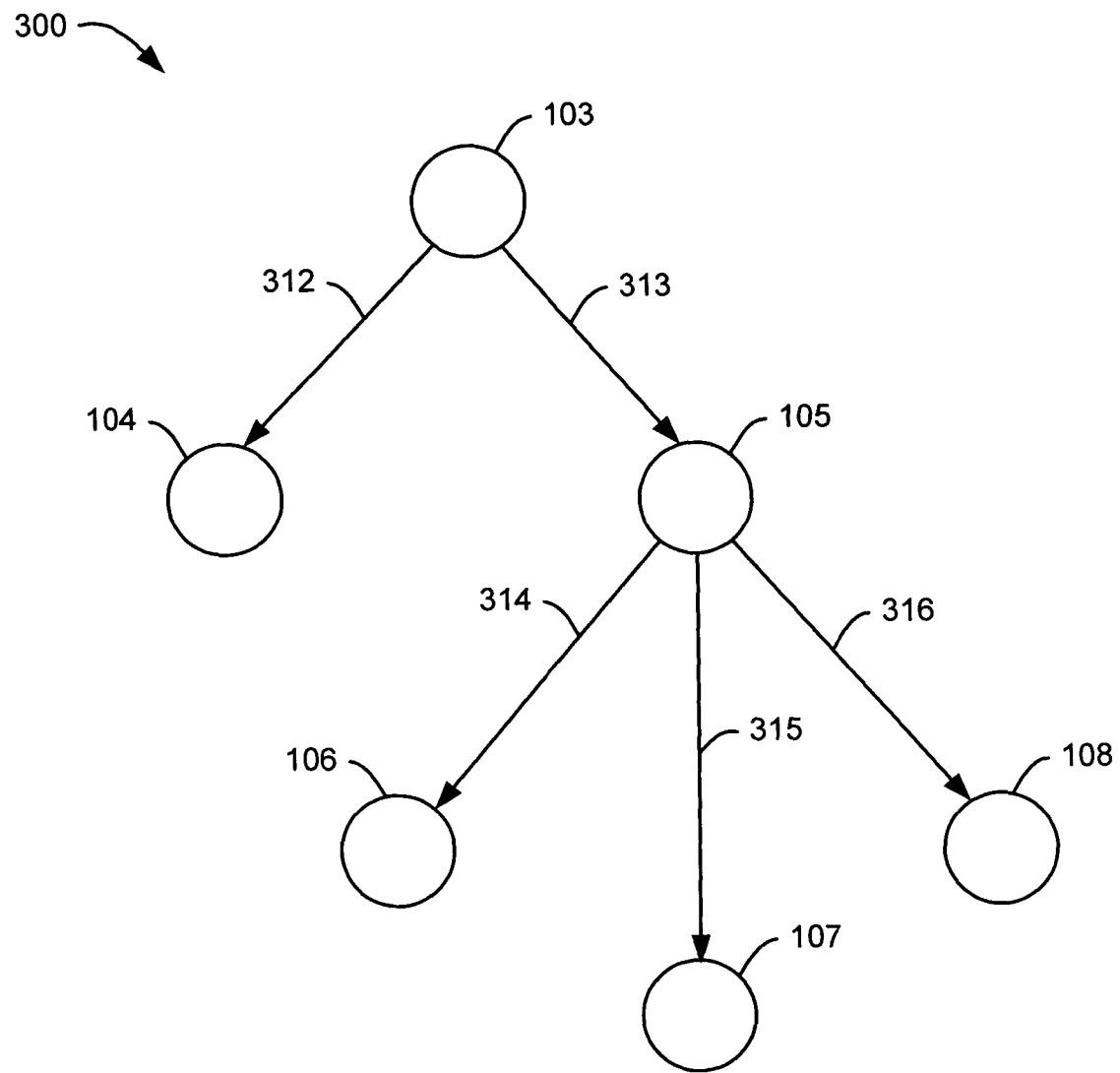
FIG. 3 shows an example routing map for an application-level multicasting system.

FIG. 3 shows an example routing map 300 for an application-level multicasting system. The example routing map 300 includes 6 nodes that are participating in an interactive session handled by the application-level multicasting system. Typically, node 103 establishes map 300 based on network information, such as connection states between the nodes, gathered by a network monitor. Example routing map 300 represents data packet routing for a stream that is generated by node 103 or that is sent to node 103 for relating to children nodes 104-108. As shown in FIG. 3, node 103 is configured to directly send data packets to node 104 and 105 through connections 312 and 313, respectively. Connections 312 and 313 may be implemented in any type protocol. For example, connections 312 and 313 may employ TCP, UDP or IP multicast, depending on the QoS requirement. Data packet routing may be implemented in a variety of ways. For example, routing information, such as routing map 300 or a routing table, may be communicated to relay nodes, such as node 105. Routing information may also be included in the data packet, such as including a source and destination identifier.

In example routing map 300, node 103 relies on node 105 to forward data packets to nodes 106-108 with connections 314-316. For example, nodes 105-108 may be part of a private network where IP multicast is available. Thus, node 105 may be configured to send the data packets with connections 314-316 that implement IP multicast protocols.

Figure 4:
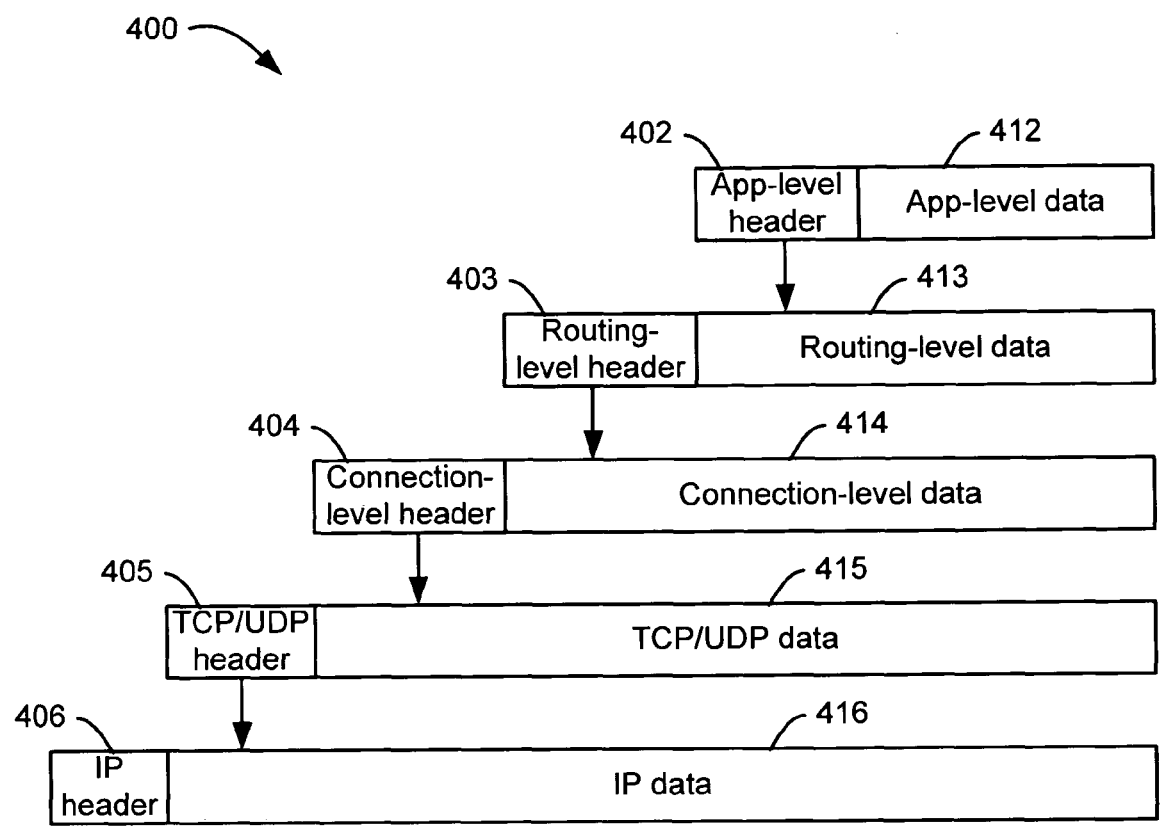
FIG. 4 shows an example protocol layering model for an application-level multicasting system.

FIG. 4 shows an example protocol layering model 400 for an application-level multicasting system. The example layering model 400 enables the application-level multicasting system to define protocols on connection, routing, and application layers. For example, an application-level message with an application-level header 402 and data 412 may be encapsulated in a routing level datagram having data 413. The routing-level message including routing level header 403 and data 413 may be encapsulated in a connection-level datagram having data 414. The connection-level message with header 404 is then sent with the transport layer protocols in messages having headers 405-406 and data 415-416.

Figure 5:
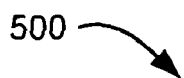
FIG. 5 shows an example header for a connection-level protocol data packet for an application-level multicasting system.

FIG. 5 shows an example header 500 for a connection-level protocol data packet for an application-level multicasting system. Typically, the connection layer is the lowest layer that the application-level multicasting system controls. Messages in the connection layer are typically handled by a node connection manager or a node connection module corresponding to a node in an interactive session, such as node connection modules 247-249 in FIG. 2.

As shown in FIG. 5, example connection-level data packet header 500 may include a magic word field, a version field, a reliability field, a message ID field, a message length field, a sender ID field, and a ACK sequence field. The magic word field identifies the application-level multicasting system. The version field shows the version of the application-level multicasting system. The reliability field indicates whether the current packet is supposed to be sent via a reliable transmission channel. If this packet requires reliable transmission, and is received from a UDP channel, an ACK needs to be sent upon receiving this message. The ACK sequence field contains the sequence number of the packet used for acknowledging the receipt of a need-ACK packet.

The message ID field contains the message type information. In one example, the message type may be defined as:

```
enum CLP_MESSAGE_TYPE
{
    CLP_HEL = 0x0001,     // Hello
    CLP_PRB = 0x0002,     // Probe message used to measure RTT
    CLP_APR = 0x0004,     // The answer to the Probe message
    CLP_ACK = 0x0008,     // Acknowledgement to the need_ack packets
    CLP_OTH = 0x0010,     // Others
}
```

The message length field shows the length of the packet, including the connection layer header 500. The sender ID field contains the member ID of the packet sender, which can be a different identity from the packet source.

In one example implementation, the magic word field is 6-bit; the version field is 2 bit; the reliability field is 1 bit; the ACK sequence field is 8 bit; the message ID field is 16 bit; the message length field is 16 bit; and the sender ID field is 128 bit.

As discussed above, the message types may include Hello messages CLP_HEL), probe messages (CLP_PRB), answer probe messages (CLP_APR) and acknowledgement messages (CLP_ACK). A Hello message is mainly used for setting up connections. After a node accepts a TCP connection request, the first message it receives from this connection is typically a Hello message. Otherwise, the host node may close this connection. A host node may also use the Hello message to ping the other node in the interactive session through UDP and IP multicast channels. Upon receiving the Hello message, the node connection manager may check whether there already exists a node connection module that is associated with the sender ID in the header of the data packet. If so, the node connection manager updates the connectivity information for the node connection module (e.g. set the UDP channel status to "available" if the Hello message is received from UDP). Otherwise, the node connection manager creates a new node connection module instance and associates it with the sender ID in the packet header. The body of the Hello message is empty, since the sender ID, which is always identical to the source ID in a Hello message, is already carried in the connection-level protocol packet header.

The Hello message may also used as a keep-alive message. For example, a host node may send a Hello message every 5 seconds to every available UDP and IP multicast channel to keep the link alive. If the host node has not received the Hello message for a certain amount of time (e.g. 30 seconds) from a specific link, the host node may assume that the connection is broken. In such a case, the node connection module instance will try to re-connect.

The Probe and Answer Probe messages may be used to measure the end-to-end latency. Both messages may have the same body structure: a DWORD field that contains a timestamp. In one example implementation, a host node of an interactive session sends a Probe message every 10 seconds to every available UDP channel. The timestamp in the packet indicates the sending time. Upon receiving this message, the member node in the interactive session changes the message ID to Answer Probe and sends the packet back immediately. When the host node receives the return packet, it can calculate the RTT by subtracting the timestamp carried in the packet from the current time. The result is reported to the network monitor.

In the application-level multicasting system, there are basically two kinds of packets: control messages and media streams. While the loss of media data affects the communication quality, the loss of control messages is usually damaging. For example, loss of the subscription request keeps the subscriber waiting; loss of network status updates may result in network congestion. Thus, the reliable TCP channel is usually preferred in transmitting the control messages.

However, with the existence of firewalls and NATs, TCP connections are not always available. Sometimes, UDP is the only available channel for two end systems to communicate. In an example implementation, the application-level multicasting system may use a lightweight mechanism that is similar to the "timeout and retransmission" scheme in TCP to ensure reliable delivery on UDP. The reliability field in a connection-level protocol packet header may be used. An indication in this field (e.g. a 1 in the 1 bit reliability field) indicates that the data packet needs acknowledgment. A sliding window mechanism may not be preferred because it may not be necessary to guarantee in sequence delivery.

CLP_ACK messages are used to acknowledge the receipt of a need-ack packet. For example, the body of the packet may contain a sequence number which indicates which packet the member node has received. A small field (e.g. 8-bit) can be used for the sequence number because the volume of need-ack packets will not be large.

CLP_OTH messages may be used to indicate that a packet belongs to an upper layer. In such a case, the components in the connection level may detach the connection-level protocol header and pass the data to the routing level protocol.

FIG. 6 shows an example header 600 for a routing-level protocol data packet for an application-level multicasting system. As shown in FIG. 6, example routing-level data packet header 600 may include a source ID field, a message type field, a media type field, number of receiver field, a topology length field, a receiver list field, a sequence number field, a bit rate field, and a topology field. The source ID field contains the member ID of the packet source. The message type field contains the message type information. In one example, the message type may be defined as:

```
enum RLP_MESSAGE_TYPE
{
    RLP_LKST = 0x01,    // Link Status information
    RLP_SBSC = 0x02,    // Subscription request
    RLP_UNSB = 0x04,    // Unsubscription request
    RLP_ACTP = 0x08,    // Accept the topology
    RLP_RJTP = 0x10,    // Reject the topology
    RLP_BWMS = 0x20,    // Bandwidth measurement
    RLP_BWRP = 0x21,    // Bandwidth measurement report
    RLP_STRM = 0x40,    // Media stream
    RLP_APPM = 0x80;    // Application-level message
    RLP_QUIT = 0xFF,    // Quit the session
}
```

The media type field indicates the type of media data included in the data packet. The number of receivers field indicates the number of receivers of this packet. The topology length field indicates the number of entries in the topology field. The receiver list field contains entries where each entry in list contains a member ID. The sequence number field contains the sequence number of the topology. The stream bit rate field contains the new bit rate of the stream associated with the topology. The topology field contains the topology of the multicast tree. The field may be included in messages of the type RLP_STRM, which may contain the routing information of the stream.

In one example implementation, the message type field includes 8 bits; the source ID field includes 128 bits; the media type field includes 7 bits; the number of receivers field includes 8 bit; the topology length field includes 8 bits; each entry in the receiver list field includes 128 bits; the sequence number field includes 32 bits; the stream bit rate field includes 32 bits; and each entry of the topology field includes a member ID of 128 bits and a children number of 32 bits.

Figure 7:
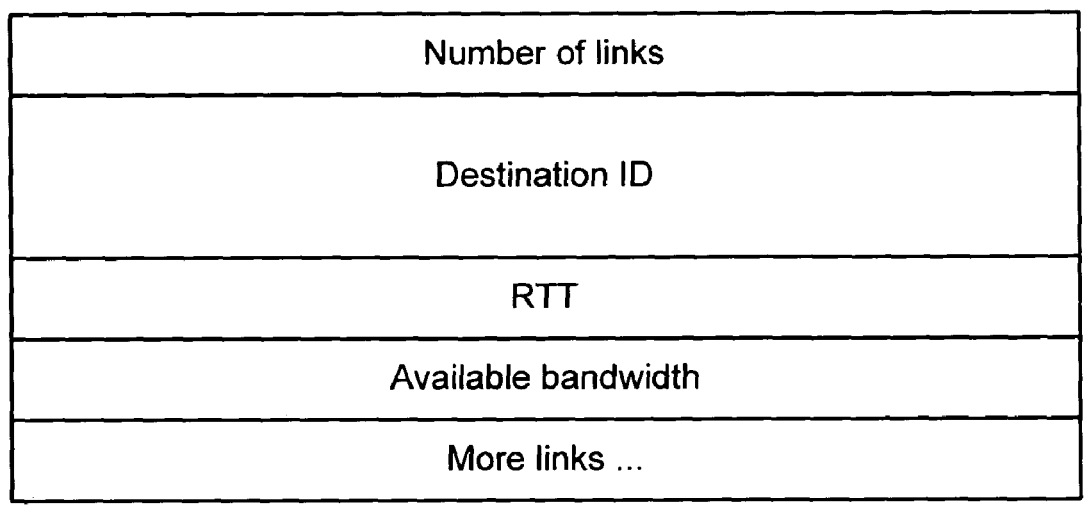
FIG. 7 shows an example data packet with routing-level protocol link status information for an application-level multicasting system.

FIG. 7 shows an example data packet 700 with routing-level protocol link status information for an application-level multicasting system. Typically, routing-level protocol link status data packets are sent by a network monitor of a node for monitoring connections or links with other nodes associated with an interactive session. The network monitor collects the network dynamics and propagates the information to the other member node periodically with the routing-level protocol link status data packets. As shown in FIG. 7, example routing-level link status data packet 700 may include a number of links field, a destination ID field, a RTT field, an available bandwidth field, and a more links field.

The number of links field indicates the number of link status entries in this packet. Each link status entry contains the destination ID, the RTT and the Available bandwidth of the link. A node typically publishes the link status of the links that originate from that node. Each destination ID field entry may only contain the member ID of the ending node. The RTT field and the bandwidth field include information about the round trip time and the transmission bandwidth of the links, respectively. The more links field may include information about other available links that originated from that node.

Typically, the routing-level protocol link status data packet is passed to the network monitor. The media delivery routes are re-computed for each stream based on the new information. If the routes differ from the previous calculation, the new topology may be carried in all the outgoing data packets of this media type, until the topology is accepted by all of the inner nodes in the new multicast tree.

Users of multiparty interactive application with an application-level multicasting system can choose to subscribe/unsubscribe to a specific media stream of a specific member in an interactive session. Subscription/unsubscription messages may be used for the selection. The messages may contain a media type. The subscriber ID and the media provider ID, which correspond to the source ID and the receiver ID, can be retrieved from the routing-level protocol data packet header. These messages are typically passed to components in the routing level. Network dynamics and subscription status may be input to the routing manager. Any change in either input may cause the re-calculation of the multicast tree.

Upon receiving the topology information from a source node associated with an interactive session, the receiving node may check whether it can relay the stream as the topology requires, for example, according to the most up-to-date available bandwidth measurement. If so, the receiving node updates the routing table and sends a RLP_ACTP message to the source node. Otherwise, the receiving node leaves the routing table unchanged and sends a RLP_RJTP message to the source node.

The RLP_ACTP message may contain a sequence number of the topology. This sequence number is generated by the source node and carried in the topology section of the packet. The sequence number helps the source node to confirm that the acceptance is in regard to the most up-to-date topology. The source node stops sending the topology after it receives the RLP_ACTP from all of the inner nodes in the multicast tree.

Sometimes, especially when two or more source nodes change their topologies at a similar time, multiple source nodes may require the same receiving node to relay their data. Since the available bandwidth is used on first-come-first-served basis, some late arrived relay request may not be satisfied. In such cases, the relay node sends a RLP_RJTP message to the source nodes. Besides the sequence number of the rejected topology, the packet may contain the up-to-date link status information of the receiving node. Based on this new information, the source node can re-calculate its multicast tree and distribute the new topology with a new sequence number.

Figure 8:
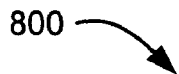
FIG. 8 shows an example data packet with bandwidth measurement information for an application-level multicasting system.

FIG. 8 shows an example data packet 800 with bandwidth measurement information for an application-level multicasting system. Packet 800 is typically used by a network monitor to measure data communication performance. The round number field indicates which round of measurement to which the packet belongs. The round number field serves to avoid mixing packets from consecutive measurement processes. The sequence number field contains the in-sequence number of this packet. The timestamp field records the sending time. The data field includes data associated with the bandwidth measurement information.

The application-level multicasting system allows the user to set and process the bandwidth measurement data at the application layer. Examples of the application layer assigned data are the user's display image and the most recent I-frame of the real-time video. These data can be passed to the network monitor through the exposed interface. By default, the network monitor may use a block of nonsense data for bandwidth measurement. The developer can also set a callback function for processing the measurement data. The structure of the data part can be defined by the developer.

FIG. 9 shows an example data packet 900 with bandwidth measurement report for an application-level multicasting system. Packet 900 is typically passed by a network monitor of a node to other nodes associated with an interactive session. The round number field identified a particular round of measurement. The increasing trend field indicates whether an increasing trend of one-way delay is observed in a particular round of measurement. If no increasing trend is observed in the current round, the sender may increase the probing rate in the next round. The available bandwidth field records the calculated available bandwidth of the measured path.

A node in an application-level multicasting system may send other data packets to other nodes in the same interactive session. For example, before leaving the interactive session, a node may send a RLP_QUIT messages to all of the nodes of the session through whatever channels that are available. Upon receiving this message, each node in the application-level multicasting system may clear the corresponding entries in the routing table and re-calculate the multicast tree if the leaving node has been a subscriber of its stream.

The media stream data handled by an application-level multicasting system can be audio, video, or any user-defined streams. Upon receiving a RLP_STREAM packet, components in the routing level, such as the routing manager, may check whether the packet includes the topology information. Then, from the local subscription list, the routing manager may check whether the local user has subscribed to the stream associated with the packet. If so, routing manager may detach the routing-level protocol header, and pass the data of the routing-level protocol packet to the application-level protocol components. The routing manager may look up the routing table to see whether to forward this packet to other nodes in the interactive session. If so, the routing manger packs a routing-level protocol header, and passes the packet down to the connection layer.

The application-level components of the application-level multicasting system can define their own messages that may not be understandable by the lower layers. When receiving such messages, the routing layer components will directly pass it to the application level. The application-level components are configured to handle the media streams, including any user-defined streams. A developer can define the application-level header as needed. If channel coding is used, the fragmentation and resembling is handled in the application level.

Figure 10:
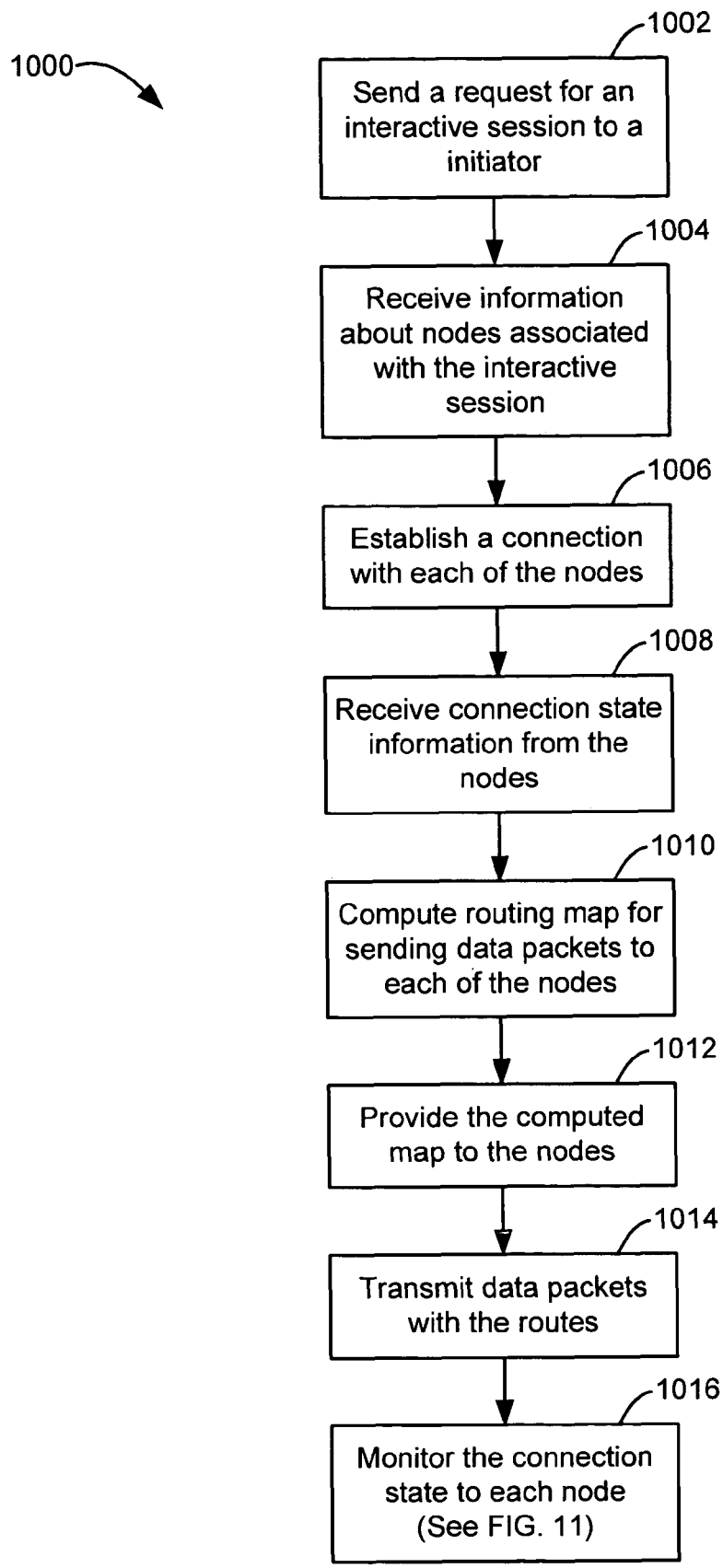
FIG. 10 shows an example process for communication with nodes of an interactive session in an application-level multicasting system.

FIG. 10 shows an example process 1000 for communication with nodes of an interactive session in an application-level multicasting system. Example process 1000 may be implemented by a node to initiate and organize the interactive session. At block 1002, a request for an interactive session is sent to a session controller. At block 1004, information about the nodes that are associated with the interactive session is received. At block 1006, a connection is established with each of the nodes. At block 1008, connection state information is received from each of the nodes. At block 1010, routing map for sending data packets to each of the nodes is computed. At block 1012, the computed routing map is provided to the nodes. At block 1014, content is transmitted with the routes. At block 1016, the connection state to each node is monitored. An example process for monitoring the connection states will be discussed in conjunction with FIG. 11.

Figure 11:
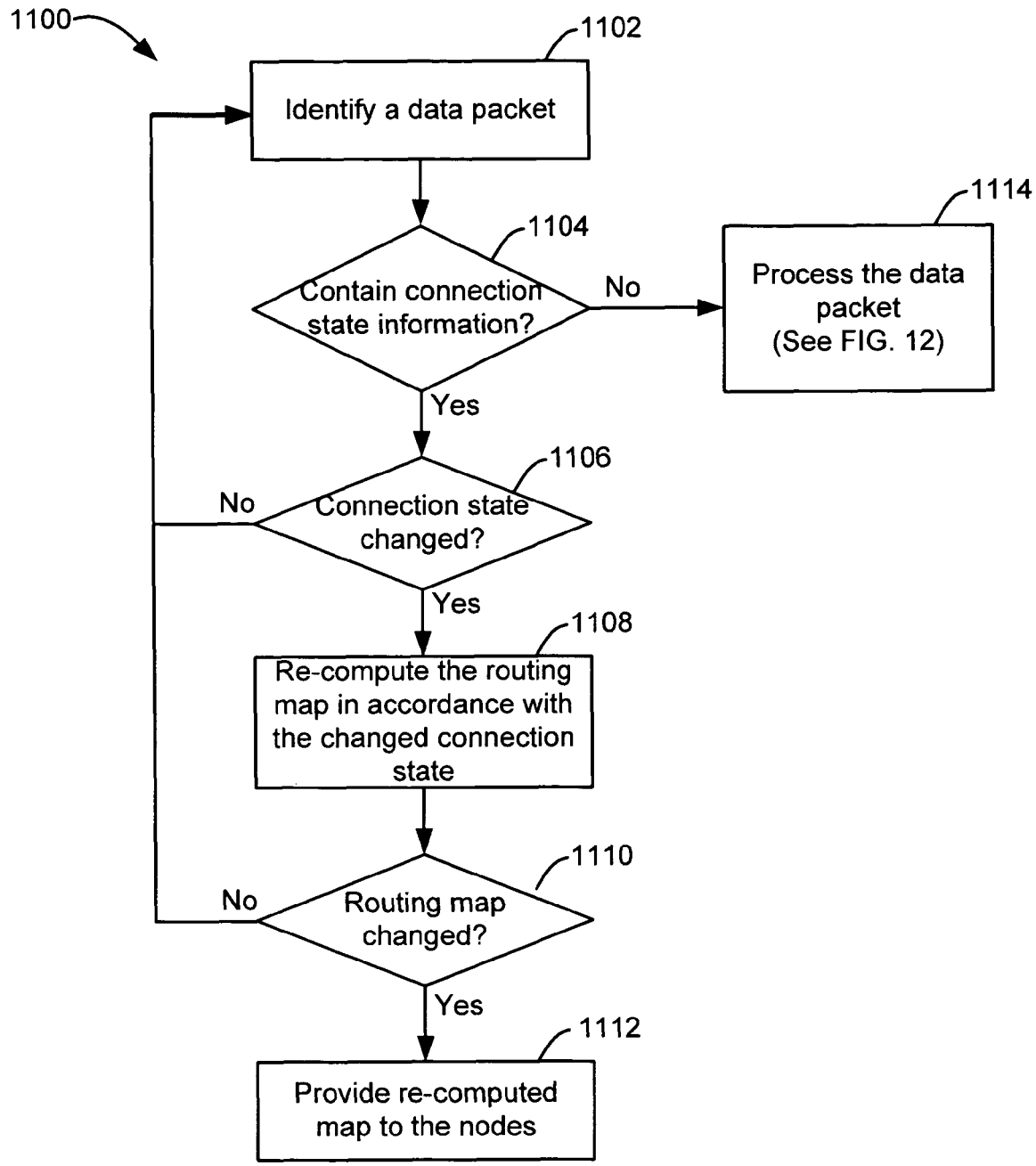
FIG. 11 shows an example process for monitoring connection states with nodes associated with an interactive session.

FIG. 11 shows an example process 1100 for monitoring connection states with nodes associated with an interactive session. At block 1102, a data packet is identified. At decision block 1104, a determination is made whether the data packet contains connection state information for a node. If so, process 1100 moves to decision block 1106. If the data packet does not include connection state information, process 1100 goes to block 1114 where the data packet is processed. An example process for processing the data packet will be discussed in conjunction with FIG. 12.

At decision block 1106, a determination is made whether the connection state has changed. If not, the process returns to block 1102. If the connection state has changed, process 1100 continues at block 1108 where the routing map is re-computed in accordance with the changed connection state. At block 1110, the re-computed routes are provided to the nodes.

Figure 12:
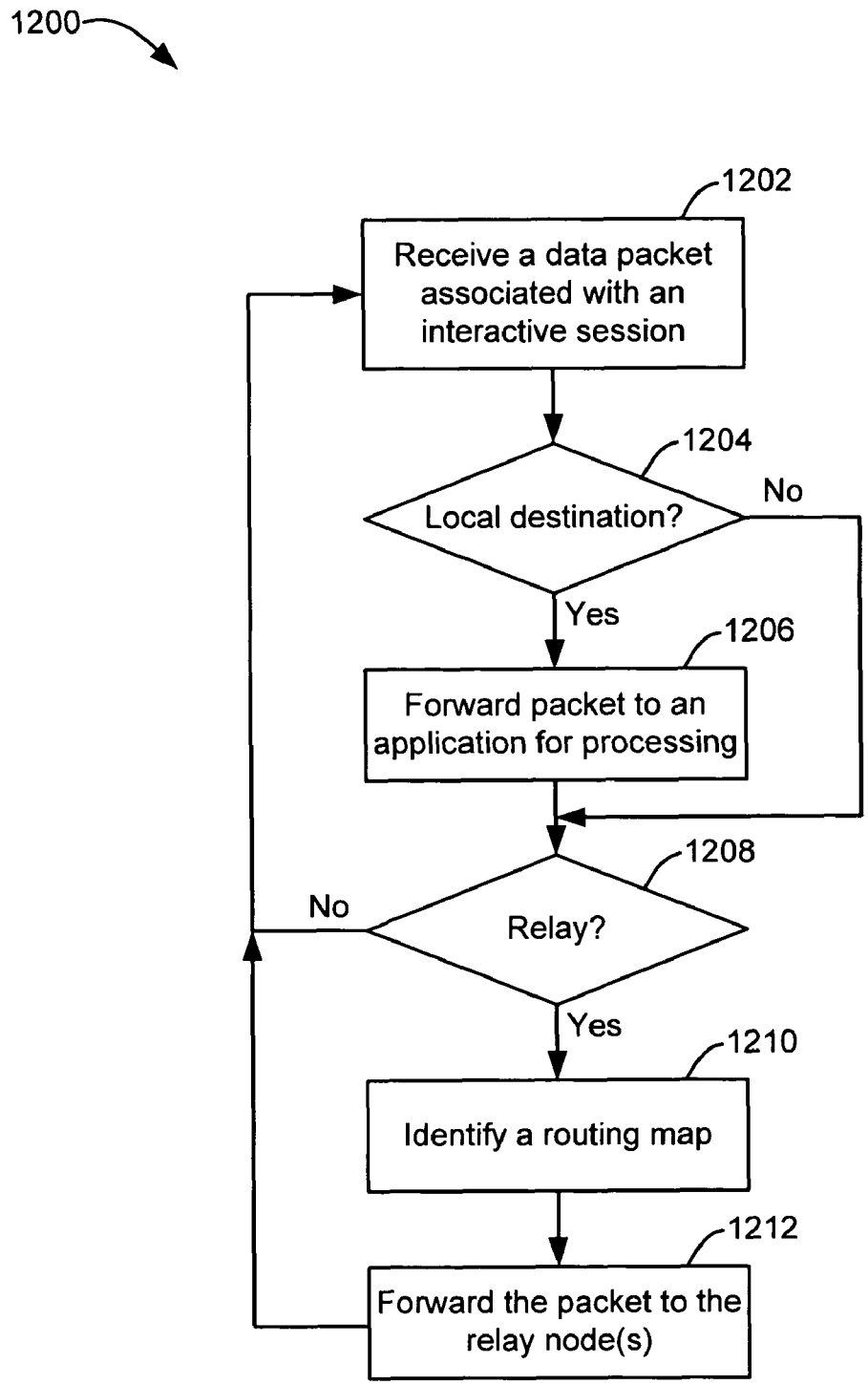
FIG. 12 shows an example process for processing a data packet associated with an interactive session.

FIG. 12 shows an example process 1200 for processing a data packet associated with an interactive session. The data packet may be sent by any of the nodes associated with the interactive session. At block 1202, a data packet associated with the interactive session is received. At decision block 1204, a determination is made whether the packet is associated with a local destination. If so, process 1200 continues to block 1206 where the packet is forwarded to a multiparty interactive application for processing. The process then moves to decision block 1208. If the packet is not associated with a local destination, process 1200 also goes to decision block 1208.

At decision block 1208, a determination is made whether to relay the data packet. If the packet is not to be relayed, process 1200 returns to block 1202. If the packet is to be relayed, the process goes to block 1210 where a routing map associated with the interactive session is identified. At block 1212, the packet is forwarded to one or more relay nodes in accordance with the routing information. For example, the packet may be forwarded to the children nodes in the routing tree. The process then returns to block 1202.

Figure 13:
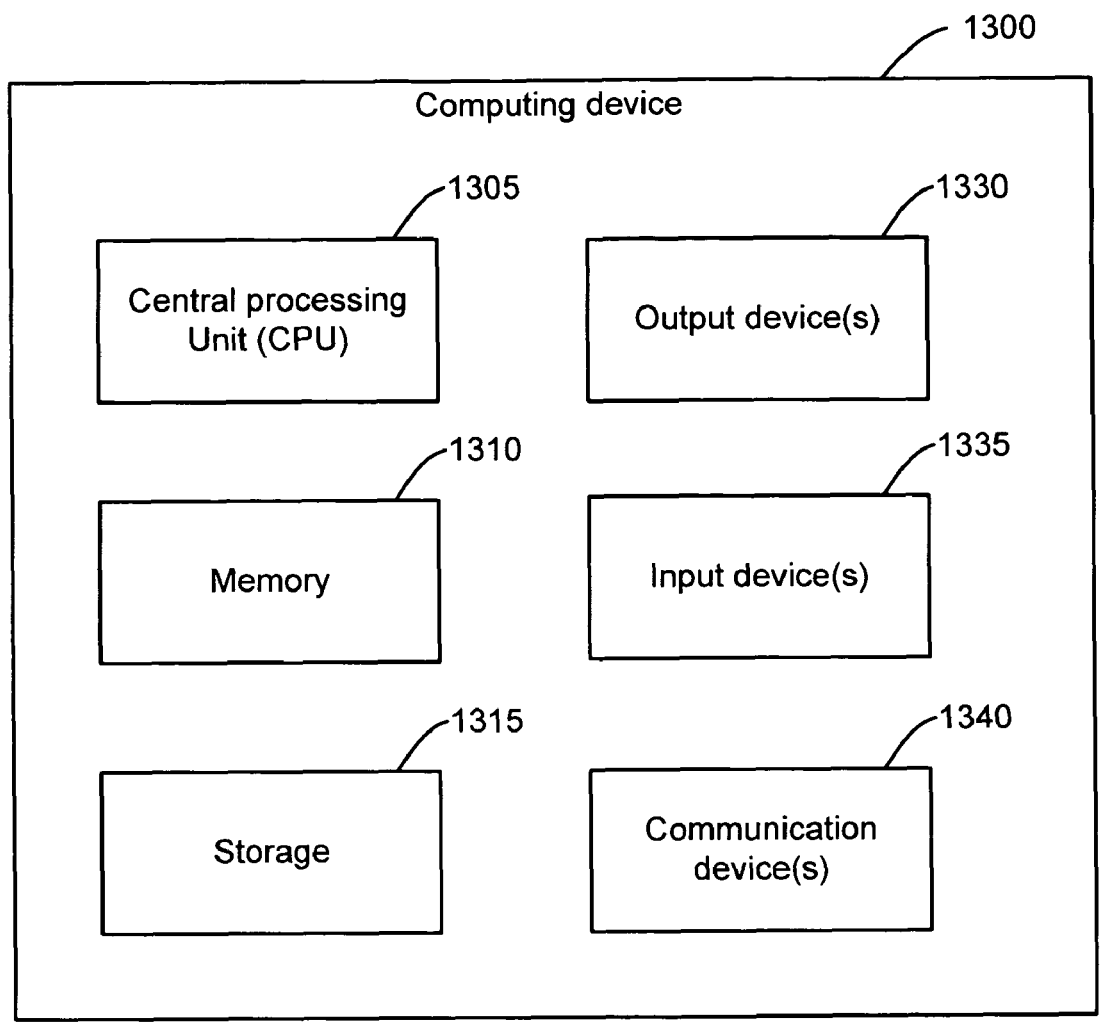
FIG. 13 shows an exemplary computer device for implementing the described systems and methods.

FIG. 13 shows an exemplary computer device 1300 for implementing the described systems and methods. In its most basic configuration, computing device 1300 typically includes at least one central processing unit (CPU) 1305 and memory 1310.

Depending on the exact configuration and type of computing device, memory 1310 may be volatile (such as RAM), non-volatile (such as ROM, flash memory, etc.) or some combination of the two. Additionally, computing device 1300 may also have additional features/functionality. For example, computing device 1300 may include multiple CPU's. The described methods may be executed in any manner by any processing unit in computing device 1300. For example, the described process may be executed by both multiple CPU's in parallel.

Computing device 1300 may also include additional storage (removable and/or non-removable) including, but not limited to, magnetic or optical disks or tape. Such additional storage is illustrated in FIG. 13 by storage 1315. Computer storage media includes volatile and nonvolatile, removable and non-removable media implemented in any method or technology for storage of information such as computer readable instructions, data structures, program modules or other data. Memory 1310 and storage 1315 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1300. Any such computer storage media may be part of computing device 1300.

Computing device 1300 may also contain communications device(s) 1340 that allow the device to communicate with other devices. Communications device(s) 1340 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 1300 may also have input device(s) 1335 such as keyboard, mouse, pen, voice input device, touch input device, etc. Output device(s) 1330 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more computer-readable media storing instructions for a node to perform a process for communicating with other nodes, each node comprising a computing device, each node respectively hosting a local application-level multicasting (ALM) module, any given one of the nodes participating in plural multicasting sessions where whichever of the nodes participate in a session send and receive multicast transmissions to each other via their respective local ALM modules, the local ALM module of any node configured to be used by arbitrary applications executing on that node, each ALM module comprising an application that uses its corresponding host node's underlying IP implementation to send and receive the multicast transmissions between nodes, the process performed by the local ALM module of the given node comprising:

maintaining information identifying sessions the given node is participating in, each session comprising a different set of other nodes which are connected via their respective local ALM modules, where an application running on the given node uses the local ALM module of the given node to multicast to the other nodes in a session and the application uses the local ALM module of the given node to receive multicasts from the other nodes in the session;

performing application-level routing, including:

storing a plurality of different routing maps, each routing map corresponding to a different session the given node is participating in via its local ALM module, each routing map describing routes to other nodes in the corresponding session;

receiving packets indicating connection state of nodes, some of which are responses to probes transmitted by the given node, and in response to state of a node in a first session changing, correspondingly changing the routing map for the first session;

receiving outgoing packets being multicast by applications on the given node to the other nodes in sessions the given node is participating in, where, for a given packet, the routing map of the corresponding session is used to select nodes of the session to transmit the packet to;

receiving incoming packets multicast by the ALM modules of the other nodes, determining if the given node is a destination for the incoming packets, where incoming packets determined to be destined to the given node are passed to corresponding applications executing on the given node, and when incoming packets are determined not to be destined to the given node they are forwarded to other nodes selected according to the routing maps;

maintaining and using node connections including:

when a node connection is created, automatically determining which IP transport layer protocol to use from among a plurality of IP transport layer protocols, the plurality including an IP multicast transport layer protocol, and opening a network connection handled by the node's implementation of the determined IP transport layer protocol, wherein the IP multicast transport layer protocol is selected for at least one node connection and an IP multicast transport layer protocol connection is opened for the at least one node connection;

receiving the incoming packets from the other nodes via the network connections, where different node connections to a same node receive incoming packets from that node using a same network connection to that node, the incoming packets then being passed to the application-level routing, wherein some of the incoming packets are received by the IP multicast transport layer protocol connection; and receiving the outgoing packets from the application-level routing, and transmitting the outgoing packets to the other nodes via the network connections, where different node connections to a same node transmit outgoing packets to that node using a same network connection to that node, wherein some of the outgoing packets are received by the IP multicast transport layer protocol connection.

2. The one or more device-readable media as recited in claim 1, the process further comprising providing the routing maps to other nodes where the ALM modules of the other nodes use the routing maps.

3. The one or more device-readable media as recited in claim 1, wherein a routing map is re-computed based, at least in part, on applying at least one of a Dijkstra's SPF algorithm or an extended broadest path first (BPF) algorithm.

4. The one or more device-readable media as recited in claim 3, wherein a session is associated with either a video conference, an audio conference, a multimedia conference, online gaming, or an event that involves multiple users.

5. The one or more device-readable media as recited in claim 1, wherein the determining which of the IP transport protocols to use is based, at least in part, on a Quality of Service requirement associated with an outgoing packet.

6. The one or more device-readable media as recited in claim 1, wherein some of the incoming and outgoing packets correspond to a data stream associated with a video conference.

7. A given node configured for communicating with other nodes, the given node and each other node comprising a computing device, the given node and each other node having a local application-level multicasting (ALM) module, the given node configured to use its local ALM module to participate in multicasting sessions where nodes in a session send and receive multicast transmissions to each other via their respective local ALM modules, each ALM module configured to be used by arbitrary applications executing on its corresponding node, each ALM module comprising an application executing on its node and interfacing with its node's underlying IP implementation to send and receive the multicast transmissions between nodes, the ALM module of the given node comprising:

a session layer maintaining information identifying sessions the given node is participating in, each session comprising a different set of the other nodes which are connected via their respective local ALM modules, where an application running on the give node uses the local ALM module of the given node to multicast to other nodes in a session and uses the local ALM module of the given node to receive multicasts from the other nodes in the session;

an application-level routing layer that:

uses a plurality of different routing maps, each routing map respectively corresponding to a different session the given node is participating in via the ALM module of the given node, each routing map describing routes to nodes in the corresponding session;

receives outgoing packets being multicast by applications on the given node to the other nodes in sessions the node is participating in, where, for a given packet, the routing map of the corresponding session is used to select nodes of the corresponding session to transmit the given packet to;

receives incoming packets multicast by the ALM modules of other nodes, determining if the given node is a destination for the incoming packets, where incoming packets determined to be destined to the given node are passed to corresponding applications executing on the given node, and when incoming packets are not determined to be destined to the given node they are forwarded to other nodes selected according to the routing maps;

a node connection layer that:

when a node connection is created, automatically determines which IP transport layer protocol to use from among a plurality of IP transport layer protocols, the plurality of IP transport layer protocols selected from including an IP multicast protocol, and opening a network connection handled by the given node's implementation of the determined IP transport layer protocol, whereby some nodes in a session use the IP multicast protocol for the IP transport layer protocol when it is available and other nodes in the session use TCP or UDP for the IP transport layer protocol;

receives the incoming packets from the other nodes via the network connections, where different node connections to a same node receive incoming packets from that node use using a same network connection to that same node, the incoming packets then being passed to the application-level routing; and receives the outgoing packets from the application-level routing, and transmits the outgoing packets to the other nodes via the network connections, where different node connections to a same node transmit outgoing packets to that same node using a same network connection to that same node.

8. The one or more device-readable media as recited in claim 7, further comprising a network monitor configured to receive data packets with information about the connection states of the nodes associated with the multicasting session and to provide the connection states to a routing module that maintains a routing table.

9. The one or more device-readable media as recited in claim 8, wherein the routing module is implemented at the application level of the node.

10. The one or more device-readable media as recited in claim 7, wherein the node uses the ALM module to participate in other multicast sessions, and the ALM module maintains, for each multicast session, an identifier corresponding to the node and an identifier corresponding to the multicast session to which the member is participating.

11. The one or more device-readable media as recited in claim 7, wherein the ALM module assembles network data packets received via the network-level connections to form the incoming packets.

12. The one or more device-readable media as recited in claim 11, further comprising managing a plurality of node connection instances, each node connection instance corresponding to at least one of the network-level connections.

13. The one or more device-readable media as recited in claim 12, wherein each node connection instance is further configured to select a transport protocol to send a data packet to the corresponding node based, at least in part, on a Quality of Service requirement associated with the data packet.

14. The one or more device-readable media as recited in claim 13, wherein each node connection instance is further configured to select from transport protocols including TCP, UDP and IP multicast.

15. A method according to claim 7.

16. A method for application-level multicasting (ALM) between nodes, each node comprising a computing device, each node having an application-level multicasting (ALM) module, where nodes in a multicast session send and receive ALM transmissions to each other via their respective ALM modules, the ALM modules configured to be used by arbitrary applications executing on the nodes, the ALM module interfacing with transport protocols provided by the node, to send and receive the multicast transmissions between nodes, the method performed by the ALM module on a node, the method comprising:

maintaining information identifying a multicast session the node is participating in, the multicast session comprising a set of the nodes;

performing application-level routing, including:

accessing a routing map for the multicast session the node is participating in via the ALM module, the routing map describing routes to each of the nodes in the multicast session;

receiving outgoing packets being multicast by an application executing on the node, where, for a given outgoing packet, the routing map is used to select nodes of the session to transmit the packet to, where one of the other nodes is an end recipient of the packet and another of the nodes is an intermediate node that will forward the packet to yet another node in the multicast session;

receiving incoming packets multicast by the ALM modules of the other nodes in the session, and passing some of the incoming packets to the application executing on the node and using the routing map to identify other nodes in the multicast session to which some of the incoming packets are forwarded;

using, by the ALM module, a transport layer IP multicast module to send and receive some of the incoming and outgoing packets to and from some of the nodes in the session, and using TCP or UDP to send and receive other of the incoming and outgoing packets to and from other nodes in the session, the node having a network stack comprising an IP module in communication with a plurality of transport layer modules including a TCP transport module, a UDP transport module, and the IP-multicast transport module, the IP-multicast transport module performing transport layer IP multicasting.

17. A method for application-level multicasting (ALM) between nodes according to claim 16, further comprising determining whether transport-layer IP multicasting is available and using the transport-layer IP multicasting module if so determined.

18. A method according to claim 16, further comprising determining which transport module to use based on a Quality of Service metric.

* * * * *